United States Patent

Kuster et al.

[11] Patent Number: 5,850,962
[45] Date of Patent: Dec. 22, 1998

[54] CASTING MOLD FOR FUSION WELDING OF TWO WORKPIECES

[75] Inventors: Frank Kuster, Ratingen; Gerhard Skreba; Michael Steinhorst, both of Essen, all of Germany

[73] Assignee: Elektro-Thermit GmbH, Essen, Germany

[21] Appl. No.: 859,176

[22] Filed: May 20, 1997

[30] Foreign Application Priority Data

May 21, 1996 [DE] Germany ............... 196 20 374.0

[51] Int. Cl.$^6$ .............................................. B23K 23/00
[52] U.S. Cl. ................... 228/33; 104/15; 266/167; 228/44.3; 228/234.3
[58] Field of Search ............... 228/33, 44.3, 50, 228/234.3; 104/15; 164/54; 249/86; 266/167

[56] References Cited

U.S. PATENT DOCUMENTS

| 3,620,291 | 11/1971 | Delachapelle | 228/234.3 |
| 4,190,228 | 2/1980 | Bommart | 249/86 |
| 4,250,944 | 2/1981 | Moring | 164/54 |
| 5,151,202 | 9/1992 | Bommart | 249/86 |
| 5,215,139 | 6/1993 | Swartz et al. | 164/54 |

*Primary Examiner*—Samuel M. Heinrich
*Attorney, Agent, or Firm*—Scully, Scott, Murphy & Presser

[57] ABSTRACT

In order to reduce the residual stresses which occur in the region of a fusion weld of two rail ends (1,2), in order to reduce, in particular to make uniform, the cooling-down rate and—associated with this—the crystallization process within the solidifying weld material, a casting mold is proposed which is equipped with a system of risers (9) and air vents (10) which are designed symmetrically with respect to a longitudinal center plane (5) and a transverse center plane (3) of the welded joint, the risers (9) and the air vents (10) being physically distributed as a function of geometric parameters of the rail foot (8) and of the weld bead (4), and the cross sections of the air vents (10) being dimensioned as a function of the cross sections of the risers (9). The positioning of the air vents (10) and of the risers (9) according to the invention in conjunction with the cross-sectional dimensioning of the former allows cooling conditions to be set up in which the weld material is effectively prevented from solidification starting on the outside with respect to the rail profile, and in which a considerable reduction in the residual stresses can be achieved, with the cooling process being slowed down overall.

14 Claims, 1 Drawing Sheet

CASTING MOLD FOR FUSION WELDING OF TWO WORKPIECES

FIELD OF THE INVENTION

The invention relates to casting molds useful in the fusion welding of rail ends.

BACKGROUND OF THE INVENTION

Fusion welds between two workpieces are known, for example, in the form of thermit welding processes, and are preferably used for welding two rails. The principle of this welding process is the great affinity of aluminum for oxygen, which is used for reduction of iron oxides, this reaction being highly exothermic and supplying the heat which is required to melt the reactants, essentially Al and $Fe_2O_3$. The reactants are present as a finely granular uniformly distributed mixture, to which steel particles and, if required, steel forming agents such as C, Mn, Cr, Mo etc. are added in order to attenuate the reaction. A defined quantity of this reaction mixture is introduced into a reaction crucible above a casting mold which surrounds the rail ends to be welded, the reduction process being initiated after the mixture has been ignited, for example by means of an ignition rod, this reduction process leading to the formation of a molten weld material, composed essentially of iron and a slag floating on it and being composed essentially of alumina. The weld material is subsequently poured into the casting area, which is bound by the casting mold and the rail ends, in order to carry out the fusion welding.

A major advantage of this welding process is that it is carried out without any external energy being supplied, and no major equipment outlay is necessary.

DESCRIPTION OF THE PRIOR ART

It is known for casting molds to be produced from quartz sand using a binding agent such as water glass, to be precise in the form of two mold halves which are matched to the rail profile and which surround, at the sides, the region between the rail ends to be welded, the casting area, which surrounds the end faces of the rail ends and the mold halves, otherwise being sealed with respect to the rail profile by means of a refractory sand.

The molten weld material is intended to fill the casting area in order to achieve a defect-free fusion joint on the basis of a defined casting rate or casting time, which is governed, inter alia, by the heat dissipation conditions, in particular the cooling rates in the region of the walls of the casting mold. The cooling rates are influenced, inter alia, by the thermal conductivity of the material of the casting mold, but also by the volume of the cast body and its geometry. The crystallization process of the melt is completed as a function of local different cooling rates and—associated with this—locally different temperatures, it also being possible for pronounced residual stresses to arise below temperatures of about 550° C. to 650° C., because of locally different shrinkage behavior as well. Since the main load on the rail profile is a bending oscillation stress, which results in tensile stresses particularly in the rail foot, these residual stresses can lead to the load capacity of the rail profile being considerably reduced.

With regard to the manner in which the molten casting material is introduced into the casting area, a distinction is drawn between so-called down casting, in which the melt material falls freely into the casting area from above, and up casting, in which the melt material fills the casting area—starting in the base region and continuing in the direction towards the upper end.

In order to avoid cavity formation and to compensate for the amount of shrinkage resulting from solidification, the casting mold is assigned a system of risers or feeders which extend at the sides alongside the rail joint, within the wall of the casting mold. The solidification process of the molten metal is completed in these risers, and the volume of these risers is determined as a function of the amount of shrinkage, the solidification time and the solidification behavior of the cast body. Overall, these risers result in molten metal also being introduced into the casting area from these risers, in addition to heat.

Finally, the casting mold is provided with a series of air channels, via which the formation of cavities composed of air or of gases escaping from the molten metal during the solidification process is prevented. The solidification process is also completed in these air channels, in the same way as in the case of the said risers.

SUMMARY OF THE INVENTION

Against this background, the object of the invention is to design a casting mold of the generic type with a view to establishing cooling conditions which are as uniform as possible and low cooling rates, in order to achieve a reduction in the residual stresses which otherwise occur. This object is achieved in the case of a casting mold of the generic type by a casting mold for the fusion welding of two rail ends (1,2), comprising mold walls which are matched to the rail profile, cover the welded joint and are composed of a refractory material, the casting area otherwise being bounded by the end faces of the rail ends (1,2), a system of risers (9) having the respective cross-sectional area A and air vents (10) having the respective cross-sectional area B being incorporated in the mold walls, the risers (9), the air vents (10), the weld joint and the weld bead (4), which has a width $W_B$, extending symmetrically with respect to a vertical transverse center plane (3), and the risers (9) and the air vents (10) furthermore being arranged symmetrically with respect to a vertical longitudinal center plane (5) of the rail ends (1, 2), wherein the centroid of the cross-sectional area A of the at least one riser (9), which is on one side of the longitudinal center plane (5), is arranged at a distance y from the side edge (11) of the rail foot (8), which distance y is defined as a function of the width $F_B$ of the rail foot (8), the cross-sectional area B, which is located on one side of the longitudinal center plane (5), of the at least one air vent (10) is selected as a function of the cross-sectional area A of the riser (9), the value y being in a range from $0.0025 F_B$ to $0.4000 F_B$, and the value B/2 being in a range from 0.05 A to 20.00 A.

DETAILED DESCRIPTION OF THE INVENTION

Figure 1:
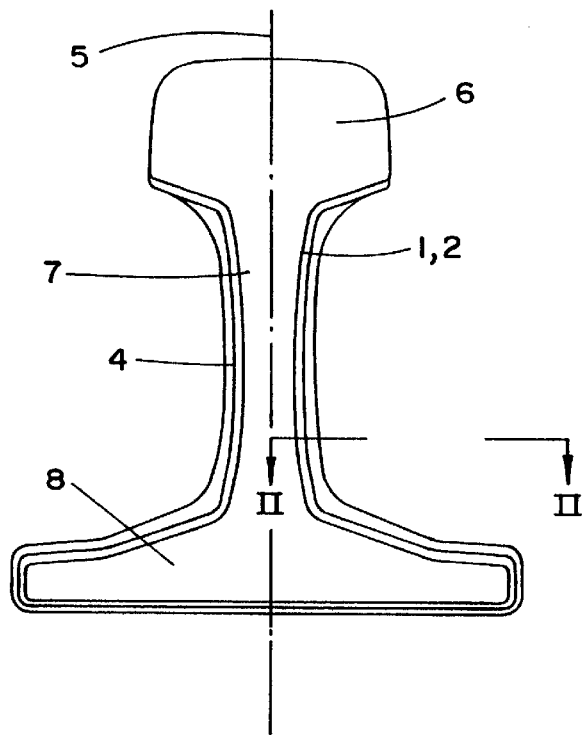
FIG. 1 shows an end view of a rail joint produced by fusion welding.

It is essential to the invention in this case that the centroid of the cross-sectional area of the at least one riser is positioned as a function of a value y which describes the distance to a side edge of the rail foot. It is also essential to the invention that the cross-sections of the air vent/air vents is dimensioned as a function of the cross-sectional dimension of the riser. The cross-sectional shape of the risers and of the air vents is in principle not constrained, the cross-section of the risers being defined essentially by the function as risers during the solidification process. In general, one riser is provided on each side of the rail profile, but this is not absolutely essential. One air vent may be provided on each side of the rail profile, but two or more air vents can also be provided on each side. An essential feature for the positioning of the air vents—provided the symmetry conditions with respect to the said vertical planes are ensured—is that a heat storage effect originates from the originally molten metal located both in the air vents and in the risers, which effect exerts an influence which makes the cooling conditions of the weld material located in the welded joint uniform. Accordingly, an essential feature for the positioning and cross-sectional design of the air vents is the thermal influence, resulting from them, on the substance of the walls of the casting mold in the sense of making the cooling process of the weld material located in the welded joint uniform and slower. In addition to heat storage, this is also dependent on a three-dimensional influence, which results from the geometry of the welded joint, on the temperatures which are formed in the walls of the casting mold. It has been found in a surprising manner in this case that a considerable reduction in the residual stresses which are formed can be achieved within the regions according to the invention for the positioning of the riser, and the dimensioning of the air vents.

In one preferred embodiment, the centroid of the cross-sectional area B of all the cross-sectional areas B of the air vent (10) / air vents (10) is arranged at a distance x from the apex of the weld bead (4), which distance x is defined as a function of the width $F_B$ of the rail foot (8), the value x being in a range from 0.025 $F_B$ to 0.350 $F_B$. In another preferred embodiment, at least one air vent (10) is in each case arranged on both sides of the transverse center plane (3), the at least two air vents (10)—seen in a direction parallel to the longitudinal center plane (5)—are at a distance z which is defined as a function of the width $W_B$ of the weld bead (4), the value of z being in a range from 0.25 $W_B$ to 0.95 $W_B$. These features are directed at the positioning of the air channels, which is carried out as a function of parameters of the weld bead such as the bead width $W_B$ and the distance between the centroid of the cross-sectional areas of the air vents and the apex of the weld bead—seen in the plane of the rail foot. Since, according to the invention, a three-dimensional influence on the temperature conditions in the walls of the casting mold is envisaged, in particular, the three-dimensional distribution of the air channels accordingly becomes particularly significant. The fact that these air vents are positioned in the region according to the invention—while ensuring the symmetry conditions mentioned initially—contributes to the cooling behavior being made considerably more uniform and being slowed down.

In other preferred embodiments, y is in a range from 0.010 $F_B$ to 0.325 $F_B$, and more preferably from 0.05 $F_B$ to 0.25 $F_B$ and even 0.075 $F_B$ to 0.200 $F_B$. The value of x is preferably from 0.01 $F_B$ to 0.25 $F_B$, and more preferably from 0.05 $F_B$ to 0.20 $F_B$ and even from 0.075 $F_B$ to 0.150 $F_B$. The value of z is preferably from 0.1 $W_B$ to 0.9 $W_B$, and more preferably 0.4 $W_B$ to 0.8 $W_B$ and even from 0.55 $W_B$ to 0.70 $W_B$. Preferably, the value of B/2 is in the range of 0.05 A to 0.75 A. These features are directed at making the parameters which govern the positioning of the risers and of the air vents and those which govern the dimensioning of the cross-section of the air vents more precise. The cross-sectional details and, in the same manner, the position details each relate to the regions in which the risers and the air vents pass through the region of the weld bead in the rail foot.

A further advantageous parameter which may contribute to solving the problem for the purposes of the objective mentioned initially is the dimensioning of the welded joint such that the distance between the end faces of the rail ends (1,2), that is the welded joint, is dimensioned to be in a range from 25 mm to 40 mm.

The parameters according to the invention apply irrespective of whether the casting mold is designed for up or down casting. There is also an effect on the cooling behavior, in addition to the cooling behavior being made uniform and the residual stresses being reduced, in that solidification starting in the edge regions of the rail profile is effectively prevented.

Figure 2:
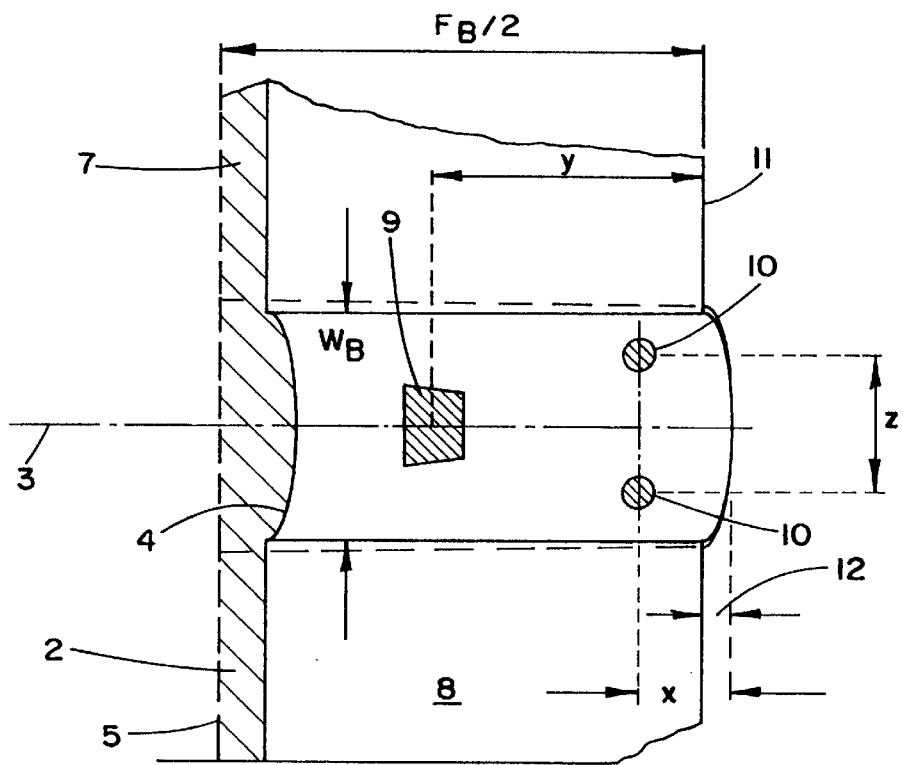
FIG. 2 shows a partial horizontal section in the region of the joint, corresponding to a plane II—II in FIG. 1.

Referring again to the drawings, FIG. 1 shows an end view of a rail joint produced by fusion welding; and FIG. 2 shows a partial horizontal section in the region of the joint, corresponding to a plane II—II in FIG. 1.

Since the essential feature of the measures according to the invention for making the solidification process uniform comprises the positioning and dimensioning of risers and air vents in the casting mold, explicit illustration of the casting mold has been dispensed with in the drawings.

FIGS. 1 and 2 show a joint, produced by thermit welding, between two rail ends 1, 2, whose joint region is marked by a transverse center plane 3. This transverse center plane 3 at the same time forms the plane of symmetry for the welded joint, which is not shown in the drawings.

A weld bead 4, which covers the welded joint on both sides, likewise extends symmetrically with respect to the transverse center plane 3.

The rail profile has a symmetrical structure with respect to a vertical longitudinal center plane 5 and comprises a rail head 6, a rail web 7 and a rail foot 8. The weld bead 4 remains in the region of the rail web 7 and the rail foot 8 and, once the welding has been carried out, only the rail head is machined in the region of its functional surfaces, in order to produce the profile which is standardized here.

The shape of the rail bead is governed by the geometry of the casting area, and the casting mold is provided with risers 9 as well as air vents 10, which are each shown by the position of their penetrating surfaces relative to the bead 4. The riser 9 has a cross-sectional area A which is dimensioned on the basis of the conditions mentioned initially, and which is thus to a very large extent governed by the function as a riser or as a feeder. The cross-sectional areas in each case extend symmetrically with respect to the transverse center plane 3. Symmetry is furthermore provided with respect to the longitudinal center plane 5, so that it is sufficient to consider only the half of the illustration shown in FIG. 2.

In the illustration shown, the riser 9 has a trapezoidal cross section—although this is not essential—and other cross-sectional shapes are equally possible. The essential feature is that the centroid of the risers 9—on one side of the longitudinal center plane 5—is at a distance y from the outer side edge 11 of the rail foot 8.

$W_B$ designates the width of the bead 4—parallel to the longitudinal center plane 5 in the plane of the drawing in FIG. 2. The dimension 12, in contrast, designates the average thickness of the bead, starting from the said side edge 11.

Finally, $F_{B/2}$ designates half the width of the rail foot 8, to be precise the distance between the side edge 11 and the longitudinal center plane 5.

The exemplary embodiment has two air vents 10, which each have a cross-sectional area B and are arranged symmetrically on both sides of the transverse center plane 3. The distance between the centers of the air channels is z. FIG. 2 of the drawings shows a circular cross-sectional shape for the air vents 10—but this is not essential.

According to the invention, the riser and the air channels are positioned as a function of the parameters $F_B$ and $W_B$ of the rail profile, the cross section of an air vent furthermore being dimensioned as a function of the cross section of a riser 9.

The arrangement of the risers 9 and of the air vents 10 as a function of the said parameters of the rail profile results in the temperature distribution within the walls of the casting mold, during casting and during the subsequent solidification process, being such that the solidification process is slowed down in the region of the welded joint and such that, simultaneously, it results in the solidification conditions being made uniform—seen over the volume of the weld material, which is molten in the original state. This results, in particular, in it not being possible for any zones to form in which lower temperatures occur on the outside than in the more centrally located regions. To this extent, a heat storage function is caused by the dimensioning and positioning of the risers 9 and of the air vents 10. The interaction of heat dissipation via the end faces of the joined rail ends and the controlled heat dissipation via the walls of the casting mold results in the solidification process taking place in particular more uniformly and slower, and this leads to the formation of a welded joint which is at least low in residual stresses.

We claim:

1. A casting mold for the fusion welding of two rail ends (1,2), comprising mold walls which are matched to the rail profile, cover the welded joint and are composed of a refractory material, the casting area otherwise being bounded by the end faces of the rail ends (1,2), a system of risers (9) having the respective cross-sectional area A and air vents (10) having the respective cross-sectional area B being incorporated in the mold walls, the risers (9), the air vents (10), the weld joint and the weld bead (4), which has a width $W_B$, extending symmetrically with respect to a vertical transverse center plane (3), and the risers (9) and the air vents (10) furthermore being arranged symmetrically with respect to a vertical longitudinal center plane (5) of the rail ends (1, 2), wherein the centroid of the cross-sectional area A of the at least one riser (9), which is on one side of the longitudinal center plane (5), is arranged at a distance y from the side edge (11) of the rail foot (8), which distance y is defined as a function of the width $F_B$ of the rail foot (8), the cross-sectional area B, which is located on one side of the longitudinal center plane (5), of the at least one air vent (10) is selected as a function of the cross-sectional area A of the riser (9), the value y being in a range from $0.0025\ F_B$ to $0.4000\ F_B$, and the value B/2 being in a range from 0.05 A to 20.00 A.

2. The casting mold as claimed in claim 1, wherein the centroid of the cross-sectional area B of all the cross-sectional areas B of the air vent (10) / air vents (10) is arranged at a distance x from the apex of the weld bead (4), which distance x is defined as a function of the width $F_B$ of the rail foot (8), the value x being in a range from $0.025\ F_B$ to $0.350\ F_B$.

3. The casting mold as claimed in claim 1 or 2, wherein at least one air vent (10) is in each case arranged on both sides of the transverse center plane (3), the at least two air vents (10)—seen in a direction parallel to the longitudinal center plane (5)—are at a distance z which is defined as a function of the width $W_B$ of the weld bead (4), the value z being in a range from $0.25\ W_B$ to $0.95\ W_B$.

4. The casting mold as claimed in claim 1 wherein the value y is in a range from $0.010\ F_B$ to $0.325\ F_B$.

5. The casting mold as claimed in claim 1 wherein the value x is in a range from $0.01\ F_B$ to $0.25\ F_B$.

6. The casting mold as claimed in claim 1 wherein the value z is in a range from $0.1\ W_B$ to $0.9\ W_B$.

7. The casting mold as claimed in claim 1 wherein the value B/2 is in a range from 0.05 A to 0.75 A.

8. The casting mold as claimed in claim 1 wherein the value y is in a range from $0.05\ F_B$ to $0.25\ F_B$.

9. The casting mold as claimed in claim 1 wherein the value x is in a range from $0.05\ F_B$ to $0.20\ F_B$.

10. The casting mold as claimed in claim 1 wherein the value z is in a range from $0.4\ W_B$ to $0.8\ W_B$.

11. The casting mold as claimed in claim 1 wherein the value y is in the range from $0.075\ F_B$ to $0.200\ F_B$.

12. The casting mold as claimed in claim 1 wherein the value x is in a range from $0.075\ F_B$ to $0.150\ F_B$.

13. The casting mold as claimed in claim 1 wherein the value z is in a range from $0.55\ W_B$ to $0.70\ W_B$.

14. The casting mold as claimed in claim 1 wherein the distance between the end faces of the rail ends (1,2), the welded joint, is dimensioned to be in a range from 25 mm to 40 mm.

* * * * *